Patented July 19, 1932

1,868,215

UNITED STATES PATENT OFFICE

JOSEPH V. MEIGS, OF JERSEY CITY, NEW JERSEY, ASSIGNOR, BY MESNE ASSIGNMENTS, TO PLASTIX CORPORATION, A CORPORATION OF DELAWARE

CARBOHYDRATE RESINOUS MATERIAL AND PROCESS OF MAKING SAME

No Drawing.   Application filed March 5, 1926.   Serial No. 92,640.

The present invention is, in part a continuation of my copending application Serial No. 72,398, filed November 30, 1925 which has matured into Patent No. 1,593,342, and relates to products involving resinous material produced by reacting phenols with carbohydrates.

One of the objects of the invention is to produce hard, strong, inert, shaped or pressed objects possessing high resistivity, mechanically and otherwise.

In addition to the disclosures made in my previous application, it has now been discovered that the amount of phenol which may be caused to react with a given weight of carbohydrate, e. g. dextrose, may be increased or decreased at the will of the operator, and that, by employing a suitable catalyst, as for example sulphuric acid, as the proportion of such catalyst, with respect to carbohydrate or phenol, is increased, so is the proportion of phenol which reacts with carbohydrate increased. The resulting products possess certain novel properties and advantages as will hereinafter be set forth.

As is well known, phenolic resins are commonly utilized by preparing, first, a fusible and soluble resin, mixing the same with filling or reenforcing material, e. g. cellulosic fibre, together with a so-called "hardening agent", usually of the methylene type, e. g. hexamethylenetetramine, and then treating such a mixture under heat and pressure, whereupon the fusible resin becomes more or less infusible and simultaneously acts as an impregnating or binding agent for the filling or other material incorporated therewith. Such a procedure is very common with the phenol-formaldehyde resins and may also be followed with other phenolic resins.

It has been found that the proportion of phenol which is made to react with dextrose or other suitable carbohydrate exerts a profound influence on the technical usefulness of the resulting resins. It has been found, for example, that by suitably hardening such products, the resistivity of the products increases as the proportion of phenol in the carbohydrate-phenol resinous reaction products increases.

A tabular digest is herewith presented, showing among other things the increase in proportion of phenol reacted with dextrose as the proportion of acid catalyst is increased, and the effect of such increased proportion of phenol on the resulting resinous products mixed with hexamethylenetetramine and wood pulp or other suitable fibrous or cellular material and these mixtures heated in a mold under commercial molding conditions.

The resistivity of the resulting products was tested by determining their transverse breaking strength according to the American Society for Testing Materials recommendations D48–21T Proceedings of American Society for Testing Materials, 1921, page 714, i. e. by placing a bar of the molded material on horizontal supports four inches apart and applying a vertically directed breaking load in the center of the four inch span. The bar measured five by one-half by one-half inches, and the modulus of rupture was calculated in pounds per square inch.

Table showing results obtained by combining increased proportions of phenol with dextrose (or products therefrom)

| No. | Exp. Serial No. | Concentration of sulphuric acid on sugar phenol | Weight of sulphuric acid sp. gr. 1.84 | Weight of crude dextrose | Weight of pure dextrose | Weight of phenol taken | Weight of phenol combined | Mols of phenol combined per mol dextrose | Total water evolved | Mols water per mol dextr. | Resistivity of products after mixing with wood pulp and hexamethylenetramine and heating under pressure |
|---|---|---|---|---|---|---|---|---|---|---|---|
| No. of column. | 1 | 2 | 3 | 4 | 5 | 6 | 7 | 8 | 9 | 10 | 11 | *12 | Measured in terms of transverse strength, lbs. per square inch, or modulus of rupture. |
| 1 | 417 | None. | None. | None. | 500 | 420 | 500 | 146 | .666 | 153 | 2.33 | |
| 2 | 415a | 0.5% | 0.5% | 2.5 | 500 | 420 | 500 | 288 | 1.32 | 153 | 2.33 | 5900 (4% hexa.) |
| 3 | 442 | 1.0% | .83% | 5.0 | 500 | 420 | 600 | 436 | 2.00 | 220 | 3.93 | 7900 (12% hexa.) |
| 4 | 451 | 3.4% | 1.417% | 17.0 | 500 | 420 | 1200 | 950 | 4.34 | 284 | 5.46 | 10500 (10% hexa.) |
| 5 | 454 | 9.0% | 2.5% | 45.0 | 500 | 420 | 1800 | 1130 | 5.15 | 312 | 6.13 | |
| 6 | 455 | 3.9% | 1.5% | 19.5 | 500 starch. | -------- | 1300 | 972 | -------- | 260 | -------- | |

*After allowing for free water or water of crystallization.

Sulphuric acid, in concentrated form, corresponding to a specific gravity of about 1.835 has been found to be an effective agent for causing rapid reaction between carbohydrates and phenols. In the above table the concentration of acid is shown on the basis of the crude carbohydrate material and also on that of the phenol reacted therewith. The weights of crude dextrose and of the pure dextrose content of said crude material follow. In number 6 (Experiment No. 455) starch was used instead of dextrose. There are then shown the weight of phenol used in the reaction and that actually combined or retained. The difference between these quantities represents the excess of phenol employed and subsequently recovered by vacuum distillation. The last two columns show the amounts of water evolved during reaction between the carbohydrate, phenol and sulphuric acid. By consulting the table, it is seen that as the concentration of sulphuric acid is increased, the amount of combined phenol increases and that the products produced from the resinous bodies, containing such increased proportions of phenol, show greatly increased resistivity, as shown by the increase in the mechanical strength. Looking at number 3, for example, corresponding to experiment, Experiment Number 442, it will be seen that 436 parts by weight of phenol are retained by the products from 420 parts of dextrose. This corresponds to approximately equal parts of dextrose and phenol. In securing this combination, the proportion of sulphuric acid was 1 per cent of the crude dextrose taken, or 0.833 per cent of the phenol.

Looking now at the next experiment, or Experiment Number 451, it is seen that by increasing the acid concentration to 3.4 per cent of the sugar, or 1.417 per cent of the phenol, much more than an equal weight of phenol is retained or combined, indeed more than twice the weight of the dextrose, the amounts of phenol and dextrose being 950 and 420, respectively, meaning 950 parts of phenol being combined by 420 parts of dextrose, or the products therefrom.

What is more important, the strength of the product produced therefrom is 10,500 pounds per square inch, whereas that made from the product where approximately equal parts of phenol and dextrose (or products therefrom) are combined is only 7,900 pounds per square inch. The product possessing the greater strength is a decided improvement over the other.

In the preferred form of the present invention, dextrose (or its equivalent) is reacted with phenol in such a way that for any given weight of dextrose substantially more than an equal weight of phenol is combined, this increased proportion of combined phenol making possible the attainment of increased resistivity.

Looking again at the above table, it will be seen under number 3, or Experiment Number 442, that two molecular weights of phenol are combined for every molecular weight of dextrose, column 10 showing that 2.00 mols of phenol are combined per mol of dextrose (or products therefrom).

In the preferred form of the invention, dextrose (or equivalent) is so reacted with phenol that for every molecular weight of dextrose taken, more than twice as many molecular weights of phenol are combined.

Preferably, at least three molecular weights of a phenol are combined for every molecular weight of the hexose. This corresponds to a ratio of three molecular weights of phenol to six atomic weights of carbon, or one molecular weight of phenol for every two atomic weights of carbon in the carbohydrate employed.

To illustrate how the preferred form of the invention may be practised, a description of experiment, Experiment Number 451, is given, in which, as shown in the above table, 4.34 molecular weights of phenol are combined per molecular weight of dextrose.

*Example 1 (No. 4 in the table given above).*—The apparatus comprised a glass flask of one and one-half liters capacity, provided with an upright glass air-cooled condenser and an inclined water-cooled condenser, the latter being connected to, and leading from, the top of the former.

1200 grams of phenol and 17 grams of concentrated sulphuric acid, sp. gr. 1.835, were placed in flask and heated to 130° C. 500 grams of Argo corn sugar (84.1% dextrose) were then added and dissolved in the hot acid solution. Heating was continued to ebullition and water and phenol evolved. By virtue of the air-cooled condenser, most of the phenol refluxed back into the flask, while water passed through and was condensed in the water-cooled condenser. During three hours the temperature of the reacting bodies increased to about 186° C. and was held at about that point until the evolution of water had practically ceased. The total reaction period lasted five and one-half hours. Sulphur dioxide was evolved during the reaction. At the end, vacuum distillation was used, and unreacted or excess phenol thereby removed. 250 grams of phenol were recovered, showing that 950 grams had been retained, or 4.33 mols per mol of dextrose. 284 grams of water were collected, or 5.46 mols per mol of dextrose.

The residue in the flask was a black resin, solid and brittle when cold and readily fusible when heated. It was capable of heating to relatively high temperatures without becoming infusible but could readily be rendered infusible by heating with suitable hardening agents. It was substantially soluble in alcohol. 200 parts by weight were mixed with 20 parts of hexamethylenetetramine, 290 parts of ground wood pulp and 3 parts of stearic acid, first in a ball mill and then on heated differential rolls. The resulting composite material, when heated in a mold under 500–2000 pounds pressure per square inch and at a temperature corresponding to 130 to 150 pounds per square inch of steam pressure, for a period of seven minutes yielded a hard, inert, infusible, shaped article possessing a transverse breaking strength of 10500 pounds per square inch. Heating the product a longer time did not increase the strength but rather decreased it. However, by employing 15 per cent of hexamethylenetetramine instead of 10 per cent, a product was obtained, by heating (or curing) for eight minutes which possessed a strength of 11400 pounds per square inch. This demonstrates the benefit derived from the use of increased proportions of hardening agent and is more fully hereinafter described.

Another product hardened in a manner similar to that above described and employing a quantity of hexamethylenetretramine equal to 12 per cent of the weight of the resin, but employing a resin wherein the weight of phenol combined was substantially equal to the weight of carbohydrate taken had a maximum transverse breaking strength of only 7900 pounds per square inch, after heating, as above, for ten minutes; nor did longer heating cause any substantial increase in strength.

In the above example, the quantity of phenol combined, 950 grams, represents 10.106 mols. In condensing, this should yield the same number of mols of water, or $10.106 \times 18 = 181.908$ grams of water, assuming that each molecule of phenol condensed with a hydroxyl group of the sugar, or in such other manner as to produce one molecule of water. Moreover, the crude dextrose contained 11 per cent of moisture, or $(0.11 \times 500) = 55$ grams. The sulphuric acid contained about 5% of water or 2.25 grams. Assuming that this sulphuric acid was fully reduced, an additional 3.1 grams of water, approximately would be produced. The sum of these quantities of water equals 236.91 grams plus the possible small amount attributable to the reduction of $H_2SO_4$. Actually 284 grams of water were obtained. There is therefore a discrepancy between the quantity of water attributable to mere condensation of phenol with sugar and that actually obtained. This discrepancy, however, is not so great as where smaller proportions of phenol are combined and becomes still less as greater proportions of phenol are combined.

Looking again at the table, it is seen under number three, or Experiment Number 442, that the number of mols of water produced per mol of dextrose is substantially twice as great as the number of mols of phenol combined per mol of dextrose taken. Under number 5, or Experiment Number 454, however, this ratio is decreased to substantially 6.1 to 5.1, instead of 2 to 1. In this latter case, 1130 grams of phenol were combined for 500 grams of crude dextrose used.

In my former application it is stated that the discrepancy between the amount of water evolved and that attributable to mere condensation of phenol with carbohydrate is to be ascribed to an internal dehydration of the carbohydrate. With increased proportions of combined phenol, it is, however, seen that this discrepancy is less but nevertheless marked.

The reaction is preferably carried out at high temperatures, as shown, and in the presence of more phenol than will combine, and until no more water is eliminated or until the elimination of water is very slow. The excess of phenol acts as a solvent, and keeps the viscosity of the reaction mass sufficiently low to facilitate thorough water elimination and thereby obtain an anhydrous product.

When sulphuric acid is used to promote reaction by the methods herein disclosed, sulphur dioxide is usually evolved. This shows that the sulphuric acid is reduced and at least in part, eliminated during the reaction. It also shows that the sulphuric acid catalyst acts as an oxidizing agent. The invention is not, however, limited to the use of sulphuric acid as described and is broad enough to cover all means of reacting a carbohydrate and a phenol wherein the phenol is combined in the proportions herein stated.

The source of resistivity in the resinous products prepared as described resides in the proportion of phenolic substance combined with carbohydrate substance, rather than the particular means by which such proportions are combined, and the invention is not therefore limited to such particular means as is specifically described. It includes all other means that may produce equivalent results, as, for example, on theoretical grounds, the use of acidic substances other than sulphuric acid, e. g. sulphonyl chloride, chlor-sulphonic acid should produce similar results. When sulphuric acid is added to phenol, phenol sulphonic acid is formed so that when sulphuric acid is employed as herein set forth, the actual catalyst is, no doubt, phenol sulphonic acid, rather than free sulphuric acid. It is highly probable that many other sulphonic and possibly sulphinic acids would act similarly.

When employed as herein set forth, sulphuric acid may be substantially eliminated during reaction in the form of sulphur dioxide, which being a gaseous substance, is readily evolved. The evolution of sulphur dioxide is particularly noticeable at temperatures above 140° C. It is advantageous to eliminate as much of the sulphuric acid as possible, or practicable, in the form of sulphur dioxide, in order to secure a resinous substance containing a minimum proportion of the acid catalyst employed. The term "catalyst", as herein employed, has a broader meaning than that corresponding to strict scientific usage and embraces any substance or means capable of bringing about reaction between a carbohydrate and a phenol for the purposes herein set forth. The catalyst may be destroyed or automatically eliminated during the reaction, as illustrated for sulphuric acid, or it may remain in the reaction products and form a part of the final product, as, for example, in the case of aniline. Or, the catalyst may be eliminated or neutralized by chemical means.

Instead of phenol or carbolic acid, its homologues, the cresols and xylenols, phenol ethers, e. g. guaiacol, the naphthols and other phenolic bodies may be used. It has, however, been found that ordinary phenol is better adapted than other phenols for the preparation of products of the highest resistivity. The invention is, however, broad enough to include phenolic bodies generally.

Instead of dextrose, which is given merely as a specific example of a carbohydrate, other sugars or sugar-yielding materials may be employed, including the dextrins, starches and celluloses. Many of the commercial carbohydrate materials contain dextrose, or will yield it upon treatment with acids, e. g. cane sugar, dextrin, starch, cellulose, etc. The invention is not limited to any particular carbohydrate or group of carbohydrates and is broad enough to include all the carbohydrates.

The following example will illustrate the use of starch, instead of a sugar:

*Example 2.*—The same apparatus and method of procedure was employed as described in Example 1.

To 600 grams of phenol, 9 grams (1.5%) of sulphuric acid (specific gravity 1.84) was added, the solution heated to 130° C. and 230 grams of commercial corn starch containing about 207 grams of starch and 23 grams of water, were then added and dissolved. The resulting solution was then distilled, during an hour, in a flask provided with a column, as in Example 1, or until the temperature of the reaction mass reached 190° C. The temperature was then held approximately constant for two hours, or until the evolution of water had practically ceased. Excess phenol was then eliminated by vacuum distillation. 120 grams of water were evolved. Deducting from this 23 grams corresponding to the "moisture" present in the starch, it is seen that 97 grams of water were produced by chemical reaction, the quantity of water being slightly less than half the weight of carbohydrate used (207 grams). The quantity of phenol combined was 448 grams, which is substantially greater than twice the weight of carbohydrate taken.

Looking again at the above table, it is seen that as the proportion of catalyst is increased from 1 per cent to 3.4 per cent of the weight of crude carbohydrate taken, the proportion of phenol combined increases more than 100 per cent, whereas when the proportion of catalyst is increased from 3.4 per cent to 9 per cent, the proportionate increase in combined phenol is much less, so that a maximum seems to be reached. This maximum seems to be at about the point where the proportion of phenol to carbohydrate is as three to one in parts by weight, for ordinary phenol or carbolic acid.

The gist of the invention in this embodiment is that as the proportion of phenol combined with carbohydrate substance increases, so does the resistivity of the products that may be prepared therefrom, and that in order to prepare products possessing superior resistivity, the proportion of phenol combined with carbohydrate substance should be substantially greater than corresponds to equal parts by weight of the two substances. The upper limit of combined phenol, for present purposes, may be set at a quantity of ordinary phenol or carbolic acid equal to three times the weight of actual carbohydrate initially taken. For other phenols, of higher molecular weight, the proportion by actual weight would be correspondingly greater, i. e. in the proportion of their molecular weights.

The quantity of phenol combined may be stated to be that which will not substantially distill under a vacuum of 29.5 to 30.0 inches of mercury and at a temperature of about 150° C.

The lower limit of phenol within the scope of the present invention, combined with the carbohydrate substance may be set at a quantity equal to two-thirds of the weight of carbohydrate used. This is about the quantity shown in Example 2 of the above table.

It has, furthermore, been found, in reacting a phenol and carbohydrate, as herein set forth, that as the proportion of water evolved increases, there is an increase in the proportion of phenol combined. This is apparent from a study of columns 11 and 12 of the above table. Column 11 denotes the actual weight of water evolved, including "moisture" or water of crystallization in the carbohydrate in question. Column 12 is limited to water produced by the chemical changes taking place in the reaction between phenol and carbohydrate, and such water may be termed "water of dehydration".

According to the present invention, the reaction between phenol and carbohydrate is preferably carried out so as to eliminate substantially all of the water produced by chemical action, or otherwise.

The upper and lower limits of phenol combined, as herein set forth correspond also to upper and lower limits of water produced.

When the proportion of phenol combined is about two-thirds the weight of carbohydrate used, the quantity of water produced by chemical reaction may be about 0.24 of the weight of carbohydrate.

When the quantity of phenol combined is about 2.7 times the quantity of carbohydrate taken, the proportion of water produced by chemical reaction may be 0.61 the weight of carbohydrate.

The scope of the invention as related to the proportion of phenol combined, may be defined also, as those proportions of phenol combined, corresponding to proportions of chemically produced water lying between one quarter and three quarters of the weight of carbohydrate used. The phrase "chemically produced water" does not include in its meaning either free water or water of crystallization.

According to another form of the present invention I have discovered that the proportion of hardening agent, e. g. hexamethylenetetramine, used with carbohydrate-phenol resins, has a profound influence on the resistivity of the final heat-hardened, pressed or molded products. It has also been found that even through the proportion of phenol combined with carbohydrate be less than corresponds to the minimum proportions specified in the preferred form, nevertheless by employing a sufficient proportion of hardening agent in the hardening step, a final product of a fairly high degree of resistivity may be obtained.

For example, by proceeding according to the general method described in the above Example 2, 420 parts by weight of dextrose may be reacted with phenol so that an equal weight, substantially, of phenol is combined. For this purpose, 600 parts of phenol may be initially used and 5 parts of concentrated sulphuric acid, as reaction promoting agent. By using less sulphuric acid, or by using a basic reaction promoting agent, or by omitting the reaction promoting agent altogether, smaller proportions of phenol, than above described, may be combined.

If such a product is mixed with filling material and less than four per cent of hexamethylenetetramine and heated under pressure, the resistivity of the resulting product has been found to be uniformly low, even with prolonged heating and the use of high temperatures. In fact, a long series of experiments was carried out, wherein dextrose was reacted with phenol under many different conditions and the influence of diverse catalysts or reaction promoting agents. Proportions of phenol equal to or less than the weight of carbohydrate, were combined. The resulting products were mixed with about equal weights of wood fibre and hexamethylenetetramine and molded, i. e. compressed and heated. The proportion of hexamethylenetetramine based on the resinous substance was kept low, often four per cent or less of the weight of resin. Hexamethylenetetramine evolves ammonia when heated and it was to be concluded that if larger proportions of "hexamethylenetetramine" were used the evolution of larger quantities of ammonia would result in porosity and consequent weakness. In other words, it was not to be expected that larger proportions of "hexamethylenetetramine" would cause increased strength.

It was then found that the carbohydrate resins have the ability to react with ammonia and retain it, and by increasing the proportion of hexa to more than four per cent, and in fact to as much as between 10 and 20 per cent of the resinous substance, the resulting heated and pressed bodies possessed high resistivity as measured by transverse breaking strength and other tests.

In one case an anhydrous resin was made by reacting 420 parts of dextrose with 600 parts of phenol and 5 parts of concentrated sulphuric acid. About 220 parts of water were eliminated and 436 parts of phenol combined. This product was mixed with rather more than an equal weight of wood pulp and a quantity of "hexamethylenetetramine" equal to four per cent of the weight of resin and the product pressed and heated in a mold. The transverse breaking strength of the final product was not more than 6440 pounds per square inch, a strength attained when heated five minutes at a temperature corresponding to a steam pressure of about 150 pounds. Longer heating, instead of increasing the strength, decreased it, so that it was not possible to exceed the strength mentioned by prolonged heating.

It was finally decided to try the effect of increased proportions of hexamethylenetetramine, and in one case an experiment otherwise duplicating that just described was carried out, wherein the proportion of "hexamethylenetetramine" was increased from four to twelve. Upon heating and pressing this product in the same manner as used in the previous case, a transverse breaking strength of 7990 pounds was obtained.

In another case a resin was made by reacting 420 parts of dextrose with 100 parts of aniline (all by weight) and using 500 parts of phenol, 250 parts of which were combined, the remainder being eliminated by vacuum distillation. This product was mixed with wood pulp and a quantity of "hexamethylenetetramine" equal to 3 per cent of the weight of resin and heated under pressure in a mold. The maximum transverse strength obtainable in this way was 6260 pounds per square inch. By duplicating this procedure, except for the use of 12 per cent of "hexamethylenetetramine" instead of 3 per cent, a strength of 8180 pounds per square inch was obtained.

It has been found necessary to employ more than four per cent of "hexamethylenetetramine" as hardening agent for carbohydrate phenol resins (at least when the proportion of combined phenol in such products is not substantially greater than the weight of carbohydrate taken—exclusive of free water or water of crystallization), in order to secure resistivity suitable for general commercial utilization.

It is a further object of the present invention to produce pressed, shaped articles possessing resistivity toward water, as well as toward mechanical and other stresses.

As previously stated, it has been found that carbohydrate phenol reaction products react with and retain ammonia. This may readily be observed by allowing such products to stand in contact with ammonia solutions, whereupon the surfaces become disintegrated and often changed from black to lighter colors, e. g. brown, gray or yellow.

When such products are hardened by hexamethylenetetramine which evolves ammonia, this susceptibility to ammonia is a disadvantage, inasmuch as when the hardened products are exposed to water, the retained ammonia in the presence of water, impairs the surfaces.

If, however, prior to hardening with hexamethylenetetramine, such products are treated with a substance capable of rendering the products inert toward ammonia, the hardening action of hexamethylenetetramine then produces a substance much more resistant to the action of water.

For this intermediate treatment, furfural may be employed. It has been found that carbohydrate-phenol resins heated with furfural, are much more resistant to ammonia solutions than the untreated resins.

According to this form of the invention, the process may be carried out in three stages, viz.: an (a) stage in which a carbohydrate phenol resin is prepared by reacting a phenol and carbohydrate as described in this or my prior applications; a (b) stage in which such products are treated with, say, from 10 to 50 per cent of furfural (as by heating) or by such other substance as may render the (a) product inert or resistant to the action of ammonia, and a final or (c) stage in which the (b) product is hardened by hexamethylenetetramine, or its equivalent. Or, the (b) and (c) stages may be combined, i. e. the (a) product may be heated with a powerful hardening agent, as hexamethylenetetramine and a substance capable of rendering the product resistant to the action of ammonia (or its equivalent).

Instead of hexamethylenetetramine, other methylene amines may be used and instead of furfural, other aldehydes, or condensation products thereof, as for example, anhydroformaldehyde aniline.

Solid polymers of formaldehyde may also be employed instead of methylene amines, as for example, trioxymethylene or para formaldehyde although such material may not contribute as much mechanical resistivity as hexamethylenetetramine, or other methylene amine.

Unless the word "carbohydrate" as used herein is modified by express language, it means actual carbohydrate substance, exclusive of free water or water of crystallization.

As will be seen from reference to the above table, proportions of sulphuric acid (specific gravity 1.84 containing about 95 per cent of $H_2SO_4$ by weight) or equivalent proportions of other catalysts, from one-half to nine per cent of weight of carbohydrate are specifically illustrated.

In the preferred form of the invention, the proportion of sulphuric acid used as catalyst may vary from one to ten per cent of the weight of carbohydrate employed.

I desire to be understood as covering by patent the invention as above set forth and in all its features as broadly as the state of the art will permit, except so far as the claims hereto are expressly limited.

I claim:

1. The process of making a synthetic resin which comprises reacting by heat a phenol, a monose or monose yielding carbohydrate and an acid catalyst, and combining three molecular weights of the phenol for every molecular weight of monose.

2. The process which comprises heating a carbohydrate phenol resin with furfural whereby resinous material resistant to the action of ammonia is obtained and thereafter heating such material with a methylene amine.

3. The process which comprises incorporating in a carbohydrate-phenol resin a substance reacting with ammonia to form a water insoluble compound and heating the product with hexamethylenetetramine.

4. Resinous material resistant to the action of water comprising the derivative of a carbohydrate phenol resin reacted with a methylene amine and furfural.

5. Resinous material resistant to the action of water, comprising the reaction products of furfural and hexamethylenetetramine with a carbohydrate-phenol resin.

JOSEPH V. MEIGS.

Certificate of Correction

Patent No. 1,868,215. July 19, 1932,

JOSEPH V. MEIGS

It is hereby certified that error appears in the printed specification of the above-numbered patent requiring correction as follows: Page 2, in the table, strike out the boxed heading to columns 3 and 4, and insert instead—

| Concentration of sulphuric acid on | |
|---|---|
| Sugar | Phenol |

Page 5, line 75, for " through " read *though;* and that the said Letters Patent should be read with these corrections therein that the same may conform to the record of the case in the Patent Office.

Signed and sealed this 11th day of October, A. D. 1932.

[SEAL.]

M. J. MOORE,
*Acting Commissioner of Patents.* of other catalysts, from one-half to nine per cent of weight of carbohydrate are specifically illustrated.

In the preferred form of the invention, the proportion of sulphuric acid used as catalyst may vary from one to ten per cent of the weight of carbohydrate employed.

I desire to be understood as covering by patent the invention as above set forth and in all its features as broadly as the state of the art will permit, except so far as the claims hereto are expressly limited.

I claim:

1. The process of making a synthetic resin which comprises reacting by heat a phenol, a monose or monose yielding carbohydrate and an acid catalyst, and combining three molecular weights of the phenol for every molecular weight of monose.

2. The process which comprises heating a carbohydrate phenol resin with furfural whereby resinous material resistant to the action of ammonia is obtained and thereafter heating such material with a methylene amine.

3. The process which comprises incorporating in a carbohydrate-phenol resin a substance reacting with ammonia to form a water insoluble compound and heating the product with hexamethylenetetramine.

4. Resinous material resistant to the action of water comprising the derivative of a carbohydrate phenol resin reacted with a methylene amine and furfural.

5. Resinous material resistant to the action of water, comprising the reaction products of furfural and hexamethylenetetramine with a carbohydrate-phenol resin.

JOSEPH V. MEIGS.

Certificate of Correction

Patent No. 1,868,215.   July 19, 1932,

JOSEPH V. MEIGS

It is hereby certified that error appears in the printed specification of the above-numbered patent requiring correction as follows: Page 2, in the table, strike out the boxed heading to columns 3 and 4, and insert instead—

| Concentration of sulphuric acid on | |
|---|---|
| Sugar | Phenol |

Page 5, line 75, for " through " read *though;* and that the said Letters Patent should be read with these corrections therein that the same may conform to the record of the case in the Patent Office.

Signed and sealed this 11th day of October, A. D. 1932.

[SEAL.]

M. J. MOORE,
*Acting Commissioner of Patents.*

Certificate of Correction

Patent No. 1,868,215.  July 19, 1932,

JOSEPH V. MEIGS

It is hereby certified that error appears in the printed specification of the above-numbered patent requiring correction as follows: Page 2, in the table, strike out the boxed heading to columns 3 and 4, and insert instead—

| Concentration of sulphuric acid on | |
|---|---|
| Sugar | Phenol |

Page 5, line 75, for " through " read *though;* and that the said Letters Patent should be read with these corrections therein that the same may conform to the record of the case in the Patent Office.

Signed and sealed this 11th day of October, A. D. 1932.

[SEAL.]  M. J. MOORE,
*Acting Commissioner of Patents.*